United States Patent
Farkash et al.

(10) Patent No.: US 8,925,030 B2
(45) Date of Patent: Dec. 30, 2014

(54) FAST CHANNEL CHANGE VIA A MOSAIC CHANNEL

(75) Inventors: Eyal Farkash, Raanana (IL); Eliphaz Hibshoosh, Tel-Aviv (IL); Oded Tirza, Har Adar (IL); Len Sundy, Ramat Beit Shemesh (IL); Yair Mirsky, Jerusalem (IL)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 14/002,476

(22) PCT Filed: Dec. 22, 2011

(86) PCT No.: PCT/IB2011/055900
§ 371 (c)(1),
(2), (4) Date: Aug. 30, 2013

(87) PCT Pub. No.: WO2013/011359
PCT Pub. Date: Jan. 24, 2013

(65) Prior Publication Data
US 2013/0339997 A1    Dec. 19, 2013

(30) Foreign Application Priority Data
Jul. 18, 2011    (GB) .................................. 1112283.5

(51) Int. Cl.
*H04N 7/173*    (2011.01)
(Continued)

(52) U.S. Cl.
CPC ..... *H04N 21/4263* (2013.01); *H04N 21/23439* (2013.01); *H04N 21/4316* (2013.01); *H04N 21/4384* (2013.01); *H04N 21/44004* (2013.01); *H04N 21/4405* (2013.01); *H04N 21/4623* (2013.01); *H04N 21/8455* (2013.01)

USPC .......................................... 725/134; 725/131

(58) Field of Classification Search
USPC ............ 725/37, 100, 120, 131, 134, 139, 142
See application file for complete search history.

(56) References Cited

U.S. PATENT DOCUMENTS

| | | | |
|---|---|---|---|
| 5,724,091 A | 3/1998 | Freeman et al. | |
| 6,728,965 B1 | 4/2004 | Mao | |

(Continued)

FOREIGN PATENT DOCUMENTS

| | | | |
|---|---|---|---|
| EP | 1 775 953 A1 | 4/2007 | |
| EP | 1 830 540 A1 | 9/2007 | |

(Continued)

OTHER PUBLICATIONS

May 11, 2012 Transmittal of International Search Report and Written Opinion of the International Searching Authority for PCT/IB2011/055900.

(Continued)

*Primary Examiner* — John Schnurr
(74) *Attorney, Agent, or Firm* — Husch Blackwell LLP

(57) ABSTRACT

A fast channel change (FFC) system including a tuner arrangement to receive at least one transport stream including an aggregated video service (AVS) and TV channels, each video frame of the AVS including some video data of each channel, a demultiplexer arrangement to demultiplex a first channel and the AVS, a FCC buffer to buffer the video frames of the AVS, a decoder arrangement to decode the first channel, a controller to instruct the decoder arrangement to switch from decoding the first channel to decoding the AVS from the FCC buffer, and a graphic engine to extract the video data of a second channel from the AVS yielding a full-screen video, and output the full-screen video to a display device, wherein the controller is operative to instruct the decoder arrangement to switch from decoding the AVS to decoding the second channel. Related apparatus and methods are also described.

11 Claims, 5 Drawing Sheets

(51) Int. Cl.
*H04N 21/426* (2011.01)
*H04N 21/2343* (2011.01)
*H04N 21/431* (2011.01)
*H04N 21/438* (2011.01)
*H04N 21/44* (2011.01)
*H04N 21/4405* (2011.01)
*H04N 21/4623* (2011.01)
*H04N 21/845* (2011.01)

(56) References Cited

U.S. PATENT DOCUMENTS

| | | |
|---|---|---|
| 7,733,423 B2 | 6/2010 | Rückriem |
| 7,752,648 B2 | 7/2010 | Shelton et al. |
| 2003/0196211 A1 | 10/2003 | Chan |
| 2005/0094733 A1 | 5/2005 | Daniell |
| 2007/0171306 A1 | 7/2007 | Lowet et al. |
| 2007/0234395 A1 | 10/2007 | Dureau et al. |
| 2007/0277219 A1* | 11/2007 | Toebes et al. ........ 725/139 |
| 2008/0109557 A1 | 5/2008 | Joshi et al. |
| 2009/0079872 A1 | 3/2009 | Seong et al. |
| 2009/0245393 A1 | 10/2009 | Stein et al. |
| 2009/0322962 A1* | 12/2009 | Weeks ........ 348/726 |
| 2010/0046634 A1 | 2/2010 | Dai et al. |
| 2012/0144442 A1* | 6/2012 | Chiang et al. ........ 725/109 |

FOREIGN PATENT DOCUMENTS

| | | |
|---|---|---|
| KR | 20070002722 (A) | 1/2007 |
| WO | WO 2005/074290 A1 | 8/2005 |
| WO | WO 2005/122688 A2 | 12/2005 |
| WO | WO 2006/108953 A1 | 10/2006 |
| WO | WO 2009/158235 A1 | 12/2009 |
| WO | WO 2010/015882 A1 | 2/2010 |

OTHER PUBLICATIONS

Nov. 7, 2011 Office Communication received in connection with prosecution of GB 1112283.5.

Renaud Cazoulat et al., "On the Usage of Laser Video for Mobile Broadcast" International Organization for Standardization ISO-IEC JTC1/SC29/WG11 MPEG/M12032 (Apr. 2005).

* cited by examiner

FAST CHANNEL CHANGE VIA A MOSAIC CHANNEL

RELATED APPLICATION INFORMATION

The present application is a 35 USC §371 application of PCT/IB2011/055900, filed on 22 Dec. 2011 and entitled "Fast Channel Change via a Mosaic Channel", which was published on 24 Jan. 2013 in the English language with International Publication Number WO 2013/011359 and which relies for priority on UK Patent Application 1112283.5 filed 18 Jul. 2011.

FIELD OF THE INVENTION

The present invention relates to fast channel change using an aggregated video.

BACKGROUND OF THE INVENTION

By way of introduction, changing from one TV channel to another generally involves a long delay due to factors such as tuning, decrypting and decoding of the newly selected channel. One factor involved during decoding is waiting for a random access point in the selected TV channel to arrive.

The following references are also believed to represent the state of the art:

Korean Published Patent Application 2007/0002722 of Samsung electronic Co. Ltd.;

US Published Patent Application 2007/0171306 of Lowet, et al.;

US Published Patent Application 2008/0109557A1 Joshi, et al.;

US Published Patent Application 2009/0322962 Weeks;

US Published Patent Application 2009/245393 of Stein, et al.;

US Published Patent Application 20100046634A1 Dai, et al.;

U.S. Pat. No. 5,724,091 to Freeman;

U.S. Pat. No. 7,733,423 to Ruckriem; and

PCT Published Patent Application WO 2005/122688 of NDS Limited.

SUMMARY OF THE INVENTION

The present invention, in certain embodiments thereof, seeks to provide an improved channel change system. The system makes use of an aggregated video service during channel change.

At a broadcaster Headend, each TV channel is prepared as a separate TV channel or service. Additionally, an aggregated video service is prepared. The aggregated video service includes video data of some, or all, of the TV channels, the data typically being scaled down, so that each video frame of the aggregated video service includes video data from each TV channel included in the aggregated video service. The individual frames may be arranged in any suitable manner, for example, but not limited to, a picture mosaic or in strips of video data.

The separate TV channels and the video data of the aggregated video service are typically broadcast or multicast to a plurality of subscriber devices using one or more transport streams.

The aggregated video service is received and buffered continuously by the subscriber rendering devices. Therefore, when a subscriber wants to change TV channel, video data for the selected TV channel is extracted from the aggregated video service and used until the selected TV channel is ready for decoding. In this way channel change time can be reduced significantly, by about 1 second or more from about 2 or 2.5 seconds. The interim video extracted from the aggregated video service will typically have a lower quality than the separate TV channel. However, the temporary lower quality video is generally more acceptable to viewers than a longer delay between channel changes.

There is thus provided in accordance with an embodiment of the present invention, a fast channel change system including a tuner arrangement to receive at least one transport stream including an aggregated video service and a plurality of TV channels, each of the TV channels including video data, the aggregated video service including a plurality of video frames, each of the video frames of the aggregated video service including some of the video data of each of the TV channels, the TV channels including a first TV channel and a second TV channel, a demultiplexer arrangement to demultiplex the first TV channel and the aggregated video service from the at least one transport stream, a fast channel change buffer to buffer the video frames of the aggregated video service, the aggregated video service including a plurality of random access points, the fast channel change buffer being operative to buffer a latest one of the random access points and any of the video frames dependent upon the latest random access point for decoding purposes, and purge from the fast channel change buffer the video frames which are older than the latest random access point, a decoder arrangement including at least one decoder and at least one decoder buffer, the decoder arrangement being operative to decode the video data of the first TV channel, a controller to receive a channel change command from a subscriber to change channels from the first TV channel to the second TV channel, the controller being operative to instruct the decoder arrangement to switch from decoding the video data of the first TV channel to decoding the video frames of the aggregated video service from the fast channel change buffer yielding a plurality of decoded video frames, and a graphic engine to extract the video data of the second TV channel from the decoded video frames of the aggregated video service yielding a full-screen video of the extracted video data of the second TV channel, and output the full-screen video to a display device for display, wherein the controller is operative to instruct the demultiplexer arrangement to demultiplex the second TV channel from the at least one transport stream, and instruct the decoder arrangement to switch from decoding the video frames of the aggregated video service to decoding the video data of the second TV channel.

Further in accordance with an embodiment of the present invention, each of the video frames of the aggregated video services is formatted as a mosaic.

Still further in accordance with an embodiment of the present invention, the controller is operative to query the fast channel change buffer to ascertain a video frame X having the latest presentation time stamp of the video frames in the fast channel change buffer, instruct the decoder arrangement to fast forward from the latest random access point in the fast channel change buffer to frame X+1 of the frames in the fast channel change buffer, the frame X+1 being the frame to be presented after frame X, wherein the frames in the fast channel change buffer until, but not including, frame X+1 are decoded, but are not outputted to the graphic engine, and instruct the decoder arrangement to decode the frame X+1 and subsequent frames to frame X+1 at real-time speed and for output to the graphic engine.

Additionally in accordance with an embodiment of the present invention, the system includes a new channel buffer to buffer the video data of the second TV channel, wherein the controller is operative to instruct the decoder arrangement to switch from decoding the video frames of the aggregated video service to decoding the video data of the second TV channel from the new channel buffer.

Moreover in accordance with an embodiment of the present invention, the video data of the second TV channel extracted from the decoded video frames of the aggregated video service is of a lower picture quality than the video data of the second TV channel which is not received as part of the aggregated video service.

Further in accordance with an embodiment of the present invention, the graphic engine is operative to crop and enlarge the video data of the second TV channel extracted from the decoded video frames of the aggregated video service yielding the full-screen video.

Still further in accordance with an embodiment of the present invention, the graphic engine is operative to change the aspect ratio of the video data of the second TV channel extracted from the aggregated video service.

Additionally in accordance with an embodiment of the present invention, the system includes a security module to create a control word for decrypting the video frames of the aggregated video service if the subscriber is subscribed to any of the TV channels included in the aggregated video service, and a decryption engine to decrypt the video frames of the aggregated video service based on the control word.

Moreover in accordance with an embodiment of the present invention, the demultiplexer arrangement is operative to filter an entitlement control message which includes information for creating the control word.

Further in accordance with an embodiment of the present invention, the controller is operative to send a query, upon receiving the channel change command from the subscriber to change channels from the first TV channel to the second TV channel, to the security module whether the subscriber has access to the second TV channel, and the security module is operative to check whether the subscriber has access, and send a suitable response to the controller.

There is also provided in accordance with still another embodiment of the present invention, a fast channel change method including receiving at least one transport stream including an aggregated video service and a plurality of TV channels, each of the TV channels including video data, the aggregated video service including a plurality of video frames, each of the video frames of the aggregated video service including some of the video data of each of the TV channels, the TV channels including a first TV channel and a second TV channel, demultiplexing the first TV channel and the aggregated video service from the at least one transport stream, buffering the video frames of the aggregated video service, the aggregated video service including a plurality of random access points, wherein the buffering includes buffering a latest one of the random access points and any of the video frames dependent upon the latest random access point for decoding purposes, and purging the video frames which are older than the latest random access point, decoding the video data of the first TV channel, receiving a channel change command from a subscriber to change channels from the first TV channel to the second TV channel, then switching from decoding the video data of the first TV channel to decoding the buffered video frames of the aggregated video service yielding a plurality of decoded video frames, extracting the video data of the second TV channel from the decoded video frames of the aggregated video service yielding a full-screen video of the extracted video data of the second TV channel, outputting the full-screen video to a display device for display, demultiplexing the second TV channel from the at least one transport stream, and switching from decoding the video frames of the aggregated video service to decoding the video data of the second TV channel.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
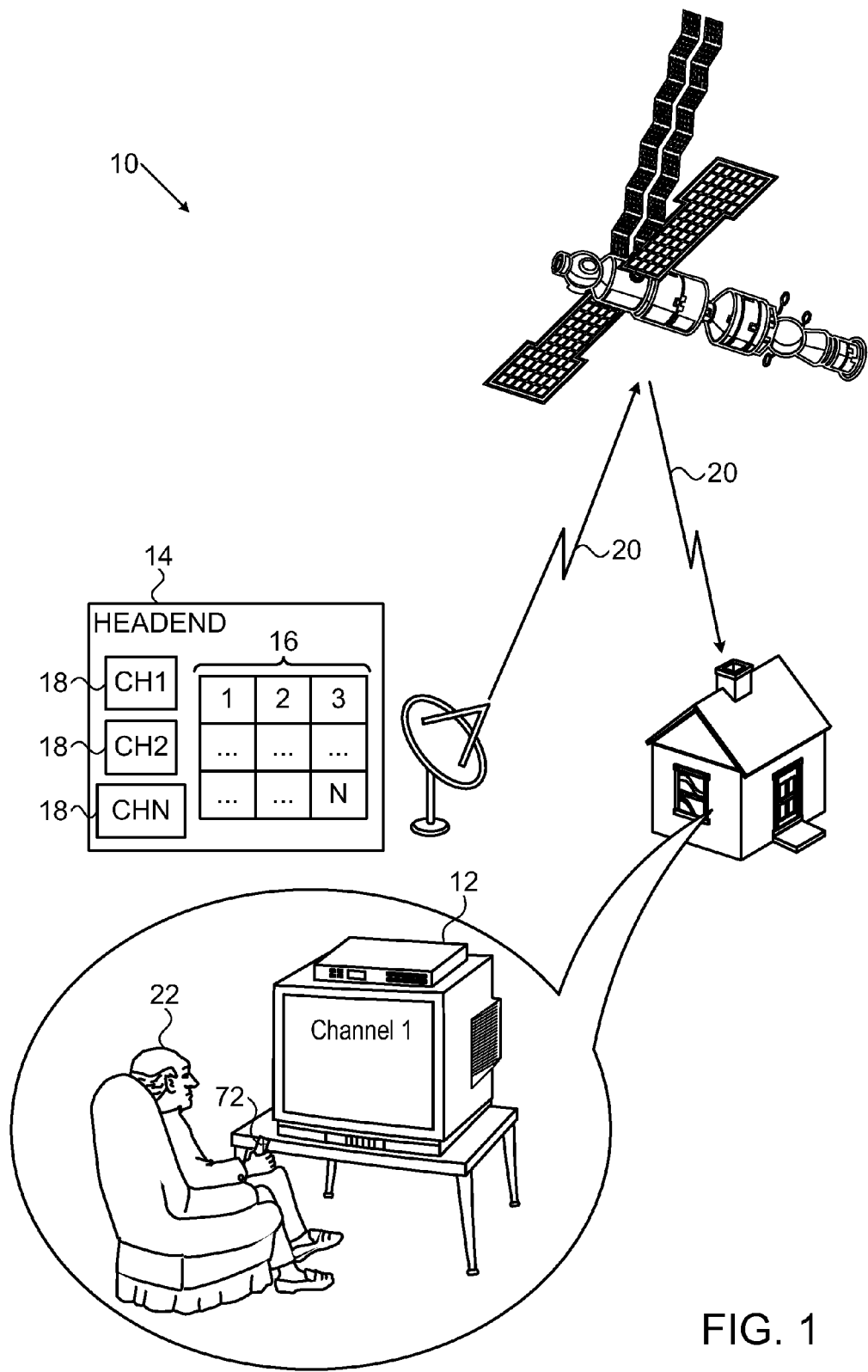
FIG. 1 is a partly pictorial, partly block diagram view of a fast channel change system constructed and operative in accordance with an embodiment of the present invention.

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" is used throughout the present specification and claims, in all of its grammatical forms, to refer to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed" are used throughout the present specification and claims, in all their grammatical forms, to refer to the reverse of "encoded" and "compressed" in all their grammatical forms.

The terms "scrambled" and "encrypted", in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:
- encoded, but neither scrambled nor encrypted;
- compressed, but neither scrambled nor encrypted;
- scrambled or encrypted, but not encoded;
- scrambled or encrypted, but not compressed;
- encoded, and scrambled or encrypted; or
- compressed, and scrambled or encrypted.

Likewise, the terms "decoded" and "decompressed" on the one hand, and the terms "descrambled" and "decrypted" on the other hand, are used to refer to different and exclusive types of processing.

Reference is now made to FIG. 1, which is a partly pictorial, partly block diagram view of a fast channel change system 10 constructed and operative in accordance with an embodiment of the present invention.

The system 10 typically includes a broadcaster Headend 14 and a plurality of subscriber rendering devices 12 (only one is shown for the sake of simplicity). It will be appreciated by those ordinarily skilled in the art that any suitable rendering device may be used such as a set-top box or a suitably configured computer. The rendering devices 12 may be wired devices or wireless mobile devices.

At the Headend 14, each TV channel is prepared as a separate TV channel or service 18 sometimes referred to herein as a regular TV channel 18. Additionally, an aggregated video service 16 is prepared. The aggregated video service 16 includes video data of some, or all, of the TV channels 18, the data typically being scaled down, so that each video frame of the aggregated video service 16 includes the video data from each TV channel 18 included in the aggregated video service 16.

The regular TV channels 18 and the video data of the aggregated video service 16 are typically broadcast or multicast to the rendering devices 12 using one or more transport streams 20. For example, channels 1-18 may be transmitted on one transport stream 20 with the aggregated video service 16 and channels 19-40 may be transmitted on another transport stream 20. Alternatively, all the channels may be transmitted on the same transport stream 20 or any suitable combination of transport streams 20.

FIG. 1 shows the transport streams 20 being broadcast via a satellite communication system. However, it will be appreciated by those ordinarily skilled in the art that the transport streams 20 may be transmitted via any suitable communication system, for example, but not limited to, cable, cellular, Internet Protocol, Terrestrial or any suitable combination thereof.

The aggregated video service 16 is received and buffered continuously by the subscriber rendering devices 12. Therefore, when a subscriber 22 wants to change TV channel, the buffered aggregated video service 16 is decoded and video data for the selected TV channel is extracted from the decoded video (typically including cropping and enlarging). The lower quality video of the selected channel extracted from the aggregated video service 16 is then displayed to the subscriber 22 until the selected higher quality regular TV channel 18 is ready for decoding. In this way channel change time can be reduced significantly, by about 1 second or more from about 2 or 2.5 seconds. The interim video extracted from the aggregated video service 16 will typically have a lower quality than the regular TV channel 18. However, the temporary lower quality video is generally more acceptable to viewers than a longer delay between channel changes.

Figure 2:
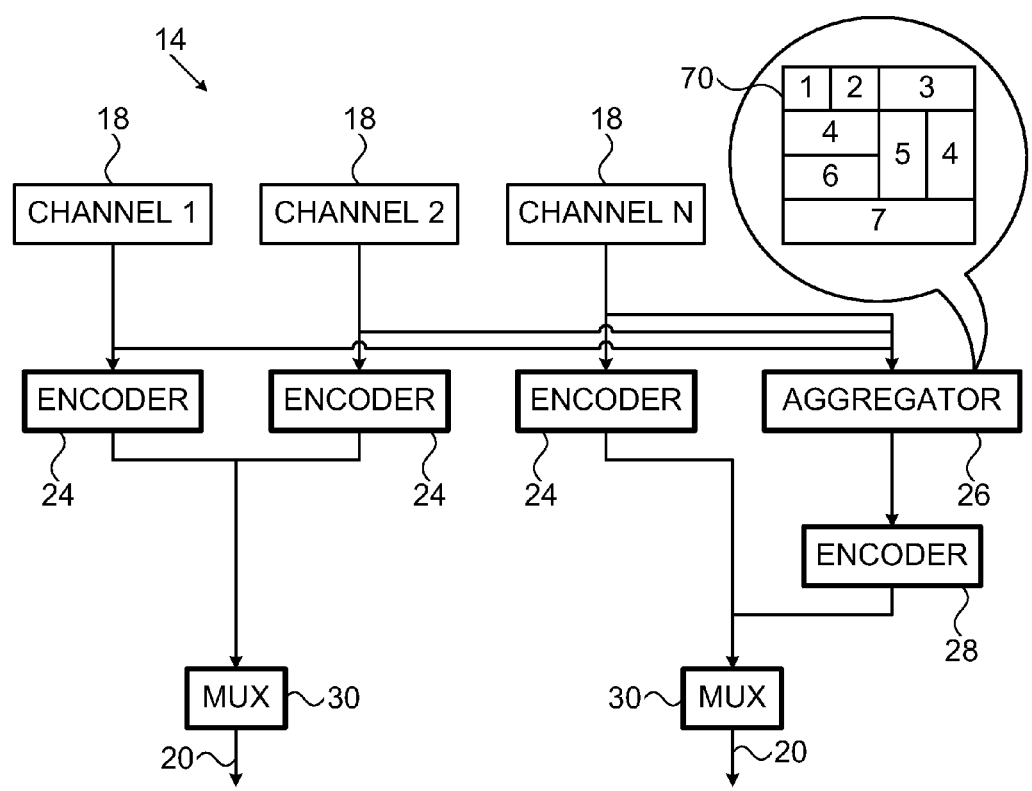
FIG. 2 is a partly pictorial, partly block diagram view of aggregation of TV channel video data in the system of FIG. 1.

Reference is now made to FIG. 2, which is a partly pictorial, partly block diagram view of aggregation of TV channel video data in the system 10 of FIG. 1.

The content for each of the TV channels 18 is typically received from a content provider (not shown). If the content is received in an encoded format, the content is first decoded.

The Headend 14 includes a plurality of TV channel encoders 24, one for each regular TV channel 18. Each encoder 24 typically encodes one of the regular TV channels 18.

The Headend 14 also includes an aggregator 26 and another encoder 28. The aggregator 26 receives the content of each of the TV channel 18 and suitably scales each of the TV channels 18 in order to create the aggregated video service 16. As described above, each video frame 70 in the aggregated video service 16 includes some, or all, of the TV channels 18. If TV channels 18 are not included in the aggregated video service 16, then channel change to one of those non-included TV channels 18 will be unable to benefit from fast channel change using the aggregated video service 16.

The aggregated video service 16 is then encoded using the encoder 28.

The Headend 14 also includes one or more multiplexers 30 which aggregate the encoded video into the transport streams 20 and typically also encrypt the encoded video. It should be noted that the aggregated video service 16 may be duplicated in one or more of the transport streams 20. The multiplexers 30 typically also multiplex conditional access data in the transport streams 20 so that all security issues are resolved. From the multiplexers 30, the transport streams 20 are transmitted to the rendering devices 12 (FIG. 1).

The aggregator 26 will now be described in more detail.

As described above, the video of each of the TV channels 18 is typically reduced in size and inserted into the aggregated video service 16. The video of each TV channel 18 may be treated the same or differently by the aggregator 26. For example, one video may be reduced more than another video. Additionally, videos may be scaled proportionally, maintaining the aspect ratio. Alternatively, videos may be scaled without maintaining the aspect ratio. In many cases, it may be convenient to process the videos to be multiples of 16 pixels.

The individual frames 70 of the aggregated video service 16 may be arranged in any suitable manner, for example, but not limited to, a picture mosaic or in strips of video data. The video data of the TV channels 18 may also be broken up into two or more segments which may be treated differently from each other in terms of image reduction and maintaining aspect ratio or not. The different parts of the same TV channel 18 may also not be disposed adjacent to each other in the frames 70 of the aggregated video service 16. The segmenting and scaling is typically performed to maximize compression, as well as paying attention to important parts of the video such as people or the centre of the video. So for example, important parts of the video may be scaled less than other less important parts of the video.

The frame size in the aggregated video service 16 may be larger than the frame size in the TV channel 18. The frame size of the aggregated video service 16 is typically limited by the encoding capabilities of the encoder 28 and the decoding capabilities of the rendering devices 12 (FIG. 1).

The frame rate of the aggregated video service 16 may be less than the frame rate of the TV channels 18, for example, but not limited to, 15 frames per second, in order to reduce the bandwidth requirements of the aggregated video service 16 and/or to include more TV channels 18 in the aggregated video service 16 and/or to increase the video quality of the aggregated video service 16.

The aggregated video service 16 typically includes high resolution video. However, it will be appreciated by those ordinarily skilled in the art that any suitable resolution may be used. The resolution of the pictures in the aggregated video service 16 is also the maximum decoding resolution.

The blurriness level of the aggregated video service 16 is typically a function of the encoding quality, frame rate and the video resolution of the aggregated video service 16.

It should be noted that the aggregated video service 16 is typically better than using a low resolution stream for each TV channel 18 as combining several videos from different TV channels 18 into the aggregated video service 16 leads to better compression of each of the pictures in the aggregated video service 16 and therefore better quality on scaling up.

It should be noted that aggregating the TV channels 18 into the aggregated video service 16 generally takes a longer time than simply encoding the individual regular TV channels 18. Therefore, the video included in the aggregated video service 16 may be delayed with respect to the presentation time of the regular TV channels 18 broadcast at the same time as the aggregated video service 16. This may happen for example if the TV channels 18 are received from the content providers too close to the time that the TV channels 18 need to be broadcast. It may be possible to introduce a delay in the Headend 14 in order to correct the misalignment of the regular TV channels 18 and the aggregated video service 16 by using some appropriate buffering of the regular TV channels 18 in the Headend 14. However, this may be unacceptable to some content providers and/or broadcasters.

Figure 3:
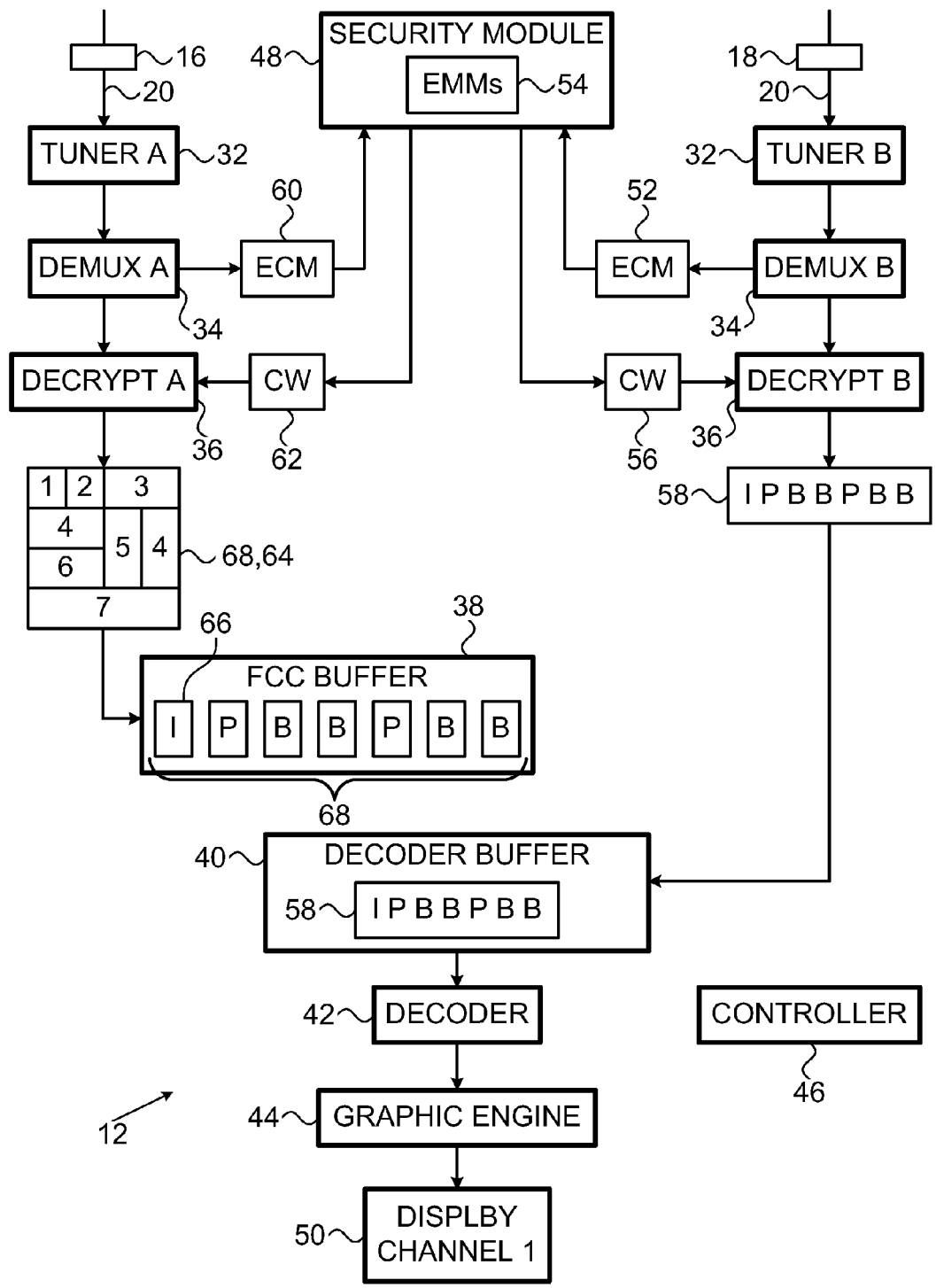
FIG. 3 is a partly pictorial, partly block diagram view of processing of incoming video data prior to a channel change in the system of FIG. 1.

Reference is now made to FIG. 3, which is a partly pictorial, partly block diagram view of processing of incoming video data prior to a channel change in the system 10 of FIG. 1.

The rendering device 12 includes: a tuner arrangement including two tuners 32 (tuner A and tuner B); a demultiplexer arrangement including two demultiplexers 34 (demux A and demux B); a decryption arrangement including two decryption engines 36 (decrypt A and decrypt B); a fast channel change buffer 38, a decoder buffer 40, a decoder arrangement including a decoder 42, a graphic engine 44, a controller 46 and a security module 48. The rendering device 12 is typically operationally connected to a display device 50, for example, but not limited to, a TV screen, a computer screen, and a projector and screen arrangement.

The subscriber 22 (FIG. 1) is currently viewing regular channel 1 on the display device 50. Tuner B tunes to the transport stream 20 including regular channel 1. The transport stream 20 including TV channel 1 is demultiplexed by demux B. An entitlement control message 52 needed to provide access to channel 1 is filtered by demux B. The entitlement control message 52 is transferred to the security module 48. The security module 48 has previously received a plurality of entitlement management messages 54 which describe the subscription limits of the subscriber 22, for example, which services or channels the subscriber 22 is entitled to view. The security module 48 may be wholly or partially embodied in a removable security element such as a smart card. The received entitlement control message 52 is processed by the security module 48 with the entitlement management message 54 for regular channel 1, thereby producing a control word 56 which is passed to the decryption engine 36 (decrypt B) for decrypting the encrypted video data of regular TV channel 1 yielding decrypted video 58. The decrypted video 58 is then buffered by the decoder buffer 40, decoded by the decoder 42. The decoded video is then typically outputted for display on the display device 50. The graphic engine 44 may be used to produce on-screen displays or other desired graphics.

At the same time, tuner A is tuned to another transport stream 20 which includes the aggregated video service 16. The aggregated video service 16 is demultiplexed by demux A. An entitlement control message 60 needed to provide access to the aggregated video service 16 is filtered by demux A. The entitlement control message 60 is transferred to the security module 48. If the subscriber 22 is subscribed to any of the channels aggregated into the aggregated video service 16, the decryption engine 36 (decrypt A) is given a control word 62 to decrypt all the content of the aggregated video service 16 (including channels 18 to which the subscriber 22 is not subscribed). The received entitlement control message 60 is processed by the security module 48 with one or more of the entitlement management messages 54, or by checking to see if the subscriber 22 has subscribed to one of the TV channels 18 in the aggregated video service 16, and thereby produces a control word 62 which is passed to the decryption engine 36 (decrypt A) for decrypting the encrypted video data of the aggregated video service 16 yielding decrypted video 64. The decrypted video 64 is then buffered by the fast channel change buffer 38. The decrypted video 64 includes a plurality of video frames 68. Some of the video frames 68 are random access points 66. The random access points 66 may be an I-frame or IDR frame.

The decrypted video 64 of the aggregated video service 16 is buffered so that a latest random access point 66 is stored in the fast channel change buffer 38 as well as the video frames 68 dependent (for decoding purposes) on the latest random access point 66. Older random access points 66 and video frames 68 dependent upon those older random access points 66 can be purged from the buffer. In other words, the fast channel change buffer 38 stores video frames 68 until the next random access point 66 is received in the fast channel change buffer 38. Then, the fast channel change buffer 38 is purged of all data up to the latest random access point 66 and buffering then restarts from the latest random access point 66. This buffering operation enables the decoder 42, upon switching, to decode the aggregated video service 16 with minimal delay.

The controller 46 typically instructs: the tuners 32 which transport stream 20 to tune to; the demultiplexers 34 which packets to filter; the decoder buffer 40 whether to take packets from the fast channel change buffer 38 or packets originating from decrypt B; and the decoder 42 to decode at a particular speed. Additional functions of the controller 46 are described in more detail with reference to FIGS. 4 and 5.

It should be noted that the demultiplexers 34, the decryption engines 36, the fast channel change buffer 38, the decoder buffer 40, the decoder 42, the graphic engine 44 and the controller 46 are typically part of a secure chip. Therefore, video data of channels 18 from the decrypted video 64 of the aggregated video service 16 not subscribed to by the subscriber 22 are typically not available viewing by the subscriber, as will be described in more detail below.

Figure 4:
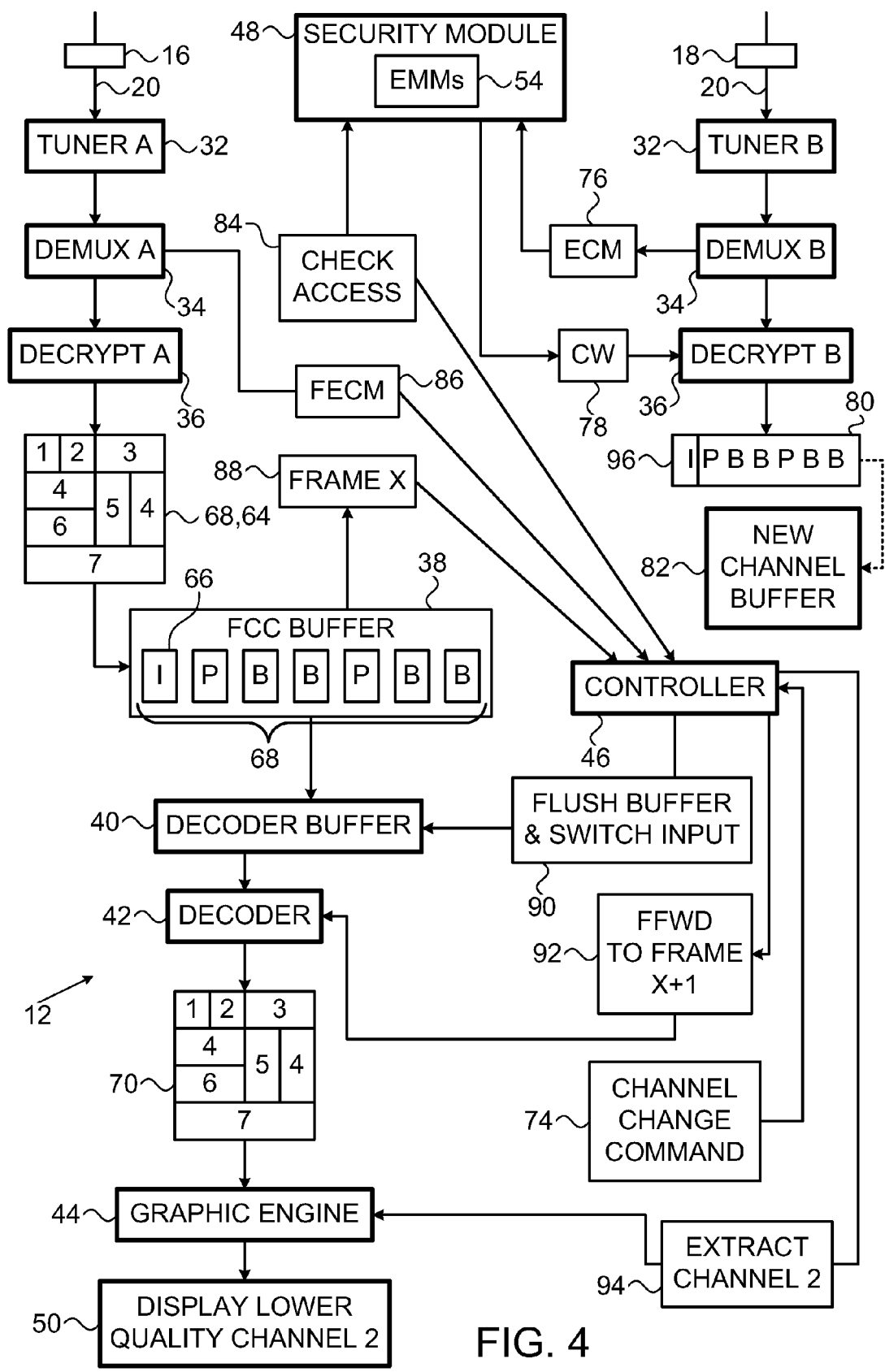
FIG. 4 is a partly pictorial, partly block diagram view of processing of video data during a first stage of channel change in the system of FIG. 1.

Reference is now made to FIG. 4, which is a partly pictorial, partly block diagram view of processing of video data during a first stage of channel change in the system 10 of FIG. 1.

The subscriber 22 (FIG. 1) decides to change channel from "channel 1" to "channel 2". The subscriber 22 makes a selection, typically using a remote control 72 (FIG. 1). The remote control 72 sends a signal to the rendering device 12 (FIG. 1) which is recognized by the controller 46 as a channel change command 74 to change channels to the selected channel ("channel 2").

The controller 46 starts two processes at substantially the same time. One process is to decode video data from the fast channel change buffer 38 in order to extract the lower quality version of the selected channel ("channel 2") and the other process is to tune (if necessary), demultiplex, and decrypt the higher quality regular selected channel ("channel 2").

The controller 46 checks whether the subscriber 22 has access to the selected channel by sending a query 84 to the security module 48. The security module 48 may check for access against the entitlement management message 54 and then send a suitable response to the controller 46. In an embodiment of the present invention, special entitlement control messages 86 (FECMs) are sent in the transport stream 20 with the aggregated video service 16. There is typically one entitlement control message 86 for each of the channels 18 included in the aggregated video service 16. The demultiplexer 34 (demux A) typically filters the entitlement control messages 86 and sends them to the controller 46. Each entitlement control message 86 may also include data as to the location of each channel 18 in the frames 70 of the aggregated video service 16. The query 84 typically includes sending the entitlement control message 86 for the selected channel to the security module 48 which prepares a suitable response based on one or more of the entitlement management messages 54.

If access to the selected channel was approved by the security module 48, the channel change process continues. If access to the selected channel was denied by the security module 48, the controller 46 instructs the graphic engine 44 to prepare an on-screen display informing the subscriber 22 (FIG. 1) that access to the selected channel has been denied.

The fast channel change buffer 38 is queried by the controller 46 to ascertain the video frame 68, frame X (block 88) having the latest presentation time stamp (the presentation timestamp having the latest time) or equivalent timecode in the fast channel change buffer 38. This information is used by the controller 46 to ensure a seamless splice to the video of the higher quality regular selected channel ("channel 2").

The controller 46 then instructs the decoder buffer 40 to: flush the stored content from the decoder buffer 40; and take input from the fast channel change buffer 38 (block 90).

The controller 46 then instructs the decoder 42 to fast forward from the random access point 66 to frame X+1 (i.e. the frame to be presented after frame X) (block 92). The frames until (not including) frame X+1 are only decoded, but are not outputted for display.

The controller 46 also instructs the decoder 42 to then decode frame X+1 and subsequent frames (according to presentation time) at real-time speed and output the decoded frames 70 (frame X+1 and the subsequent frames) to the graphic engine 44 for further processing prior to display.

The above fast forward operation needs to be performed quicker than the presentation time between two adjacent frames. If the decoder 42 is unable to fast forward at this speed, or quicker, or if the video of the TV channels 18 of the aggregated video service 16 are delayed with respect to the regular TV channels 18 sent separately (as discussed above with reference to FIG. 2), then: (1) the controller 46 does not perform the query of the fast channel change buffer 38 to ascertain frame X; and (2) the controller instructs the decoder 42 to decode the video frames 68 from the random access point 66 at real-time speed and output all the resulting decoded frames 70 to the graphic engine 44 for further processing.

It should be noted that the decoding operation fully decodes each of the video frames 68 so that the decoded frames 70 include video data of channels not selected by the user.

The graphic engine 44 receives the frames 70 from the decoder 42. The controller 46 instructs the graphic engine 44 to extract the video of the selected channel ("channel 2") from the frames 70 for display as a full-screen video (block 94) typically involving cropping, enlarging and possibly changing aspect ratios of the video extracted from the frames 70 and possibly applying image filters (for example, but not limited to, a deblocking filter) that improve the scaling quality. The information identifying the location of the video of the selected channel ("channel 2") in the frames 70, as well as scaling factors, is typically included in the entitlement control message 86 for the selected channel ("channel 2") received with the aggregated video service 16. The information identifying the location of the video, and the scaling factors, could also be included in any suitable table, for example, but not limited to, a program map table (PMT) or any suitable private table.

The graphic engine 44 outputs the full-screen (lower quality) version of the selected channel ("channel 2") which was extracted from the aggregated video service 16 to the display device 50.

It should be noted that the functionality of the graphic engine 44 may be incorporated into the decoder 42. Additionally, any of the elements of the system 10 may be combined or separated as appropriate.

Typically, at substantially, the same time that the above processing of the aggregated video service 16 takes place, the controller 46 instructs the tuner 32 (tuner B) to tune to the transport stream 20 which includes the regular selected channel ("channel 2") unless the tuner 32 (tuner B) is already tuned to the correct transport stream 20. The controller 46 instructs the demultiplexer 34 (demux B) to filter the packets for the regular selected channel ("channel 2") and an entitlement control message 76 for the regular selected channel ("channel 2"). The controller 46 instructs the demultiplexer 34 (demux B) to send the entitlement control message 76 to the security module 48. The security module 48 prepares a control word 78 based on the received entitlement control message 76 and one or more of the entitlement management message 54 resident in the security module 48. The control word 78 is sent by the security module 48 to decryption engine 36 (decrypt B) which decrypts the encrypted video data of the regular selected channel ("channel 2") yielding decrypted video 80.

If the fast forward operation is not performed (for example due to the delay in preparing the aggregated video service 16 or the decoder 42 not being fast enough), the controller 46 instructs the decryption engine 36 (decrypt B) to record the decrypted video 80 in a new channel buffer 82 starting from a first random access point 96 received for the regular selected channel ("channel 2").

If the fast forward operation is performed, then recording to the new channel buffer 82 is generally not necessary as will be explained in more detail with reference to FIG. 5.

Figure 5:
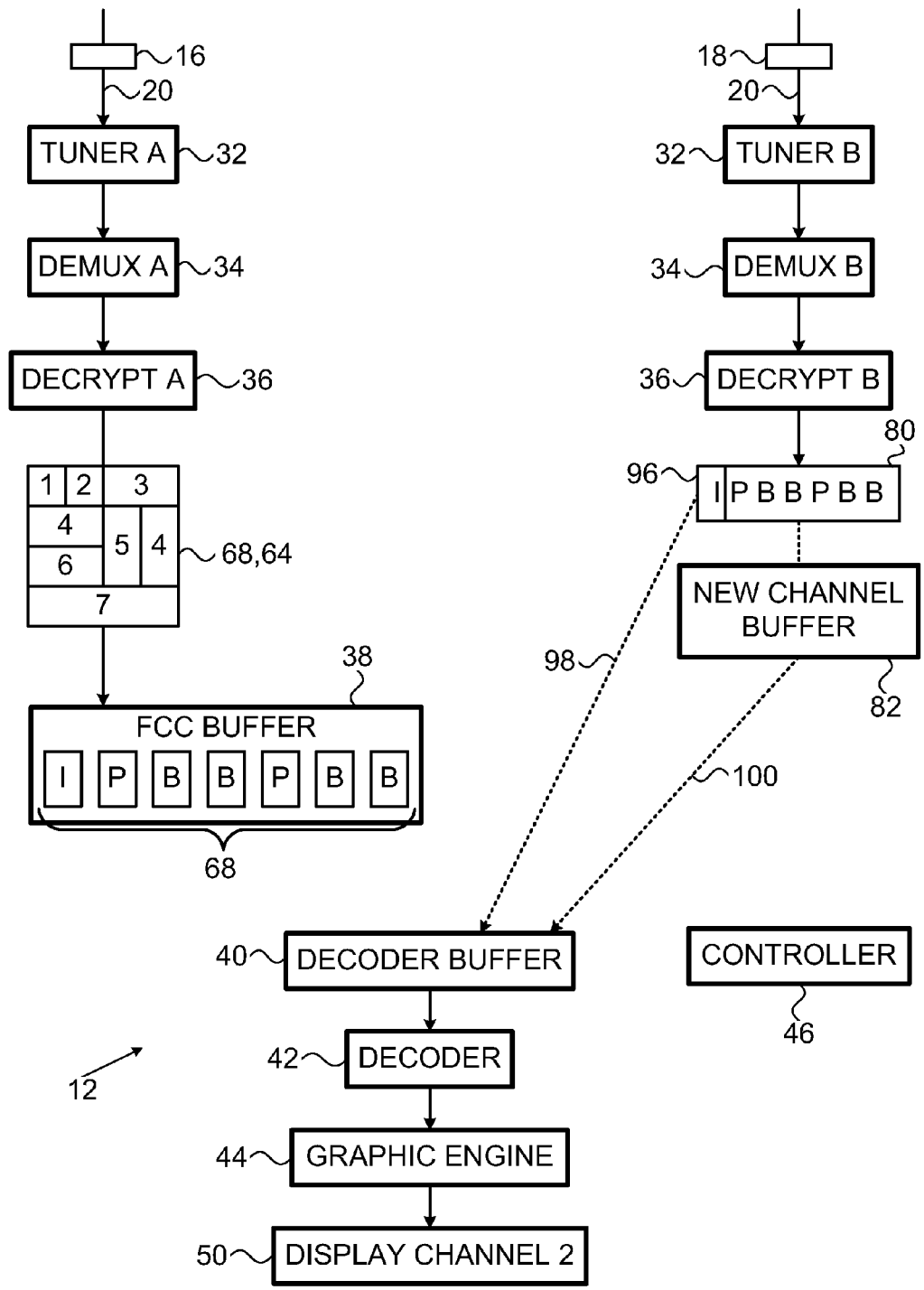
FIG. 5 is a partly pictorial, partly block diagram view of processing of video data during a second stage of channel change in the system of FIG. 1.

Reference is now made to FIG. 5, which is a partly pictorial, partly block diagram view of processing of video data during a second stage of channel change in the system 10 of FIG. 1.

If the fast forward operation described with reference to FIG. 4 is performed, then once the decryption engine 36 (decrypt B) starts to decrypt the first random access point in the high quality video of the regular selected channel (or optionally once the demultiplexer 34 (demux B) identifies the first random access point), the controller 46 instructs the decoder buffer 40 to start taking input from the output of the decryption engine 36 (decrypt B) (dotted line 98) and not from the fast channel change buffer 38. The controller 46 also instructs the graphic engine 44 not to perform any cropping or enlarging operations on the output from the decoder 42, after a certain time delay (taking into account the frames 68 still being processed by the decoder 42 and the graphic engine 44).

If the fast forward operation described with reference to FIG. 4 is not performed and the decrypted video 80 is recorded in the new channel buffer 82, then after the last frame 68 before the next random access point 66 is read from the fast channel change buffer 38 (tracked by the controller 46), the controller 46 instructs the decoder buffer 40 to switch to taking data from the new channel buffer 82 starting with the first random access point 96 instead of from the fast channel change buffer 38 (dotted line 100). If for some reason there is not enough data in the new channel buffer 82 to begin decoding of the decrypted video 80, then the switch from the fast channel change buffer 38 may need to take place just before a subsequent random access point 66. It should be noted that the regular newly selected channel will continually be decrypted into the new channel buffer 82 so that the display of the newly selected channel is always delayed. It will be appreciated by those ordinarily skilled in the art that the regular newly selected channel could be decoded at slightly faster than real-time in order to catch up to "live". The controller 46 also instructs the graphic engine 44 not to performing any cropping or enlarging operations on the output from the decoder 42, after a certain time delay (taking into account the frames 68 still being processed by the decoder 42 and the graphic engine 44).

The decoded higher quality video of the selected channel is outputted to the display device 50 for display.

Handling of audio during channel change is now described.

Upon channel change, for TV channels 18 included in the same transport stream 20 as the aggregated video service 16, the audio for the selected channel may be extracted from the audio of the regular TV channel 18.

However, if TV channels 18 are not included in the same transport stream 20 as the aggregated video service 16, then the audio for the selected channels needs to be included in the same transport stream 20 as the aggregated video service 16. The audio included in the same transport stream 20 as the aggregated video service 16 may be restricted to one or two languages and/or a lower quality.

The rendering device 12 may include more than one decoder 42, for example, using one decoder 42 for decoding the aggregated video service 16 and another decoder 42 for decoding the selected higher quality regular TV channels 18. In such a case, the aggregated video service 16 may also be continuously decoded for more instant availability. However, in such a case, the controller 46 will generally need to keep track of the presentation timestamps of the frames 68 entering the decoder buffer 40 so that the controller 46 can ensure a seamless splice with the actual higher quality video of the regular selected channel.

If the aggregated video service 16 and the regular TV channel 18 included in the aggregated video service 16 are all included within the same transport stream 20, the rendering device 12 may provide the fast channel change functionality using a single tuner 32, a single demultiplexer 34, and a single decryption engine 36.

In practice, some or all of the above described functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to subscriber rendering devices in electronic form, over a network, for example. Alternatively or additionally, the software may be stored in tangible, non-transitory computer-readable storage media, such as optical, magnetic, or electronic memory.

It is appreciated that software components of the present invention may, if desired, be implemented in ROM (read only memory) form. The software components may, generally, be implemented in hardware, if desired, using conventional techniques. It is further appreciated that the software components may be instantiated, for example, as a computer program product; on a tangible medium; or as a signal interpretable by an appropriate computer.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A fast channel change system comprising:
a tuner arrangement to receive at least one transport stream including an aggregated video service and a plurality of TV channels, each of the TV channels including video data, the aggregated video service including a plurality of video frames, each of the video frames of the aggregated video service including some of the video data of each of the TV channels, the TV channels including a first TV channel and a second TV channel;
a demultiplexer arrangement to demultiplex the first TV channel and the aggregated video service from the at least one transport stream;
a fast channel change buffer to buffer the video frames of the aggregated video service, the aggregated video service including a plurality of random access points, the fast channel change buffer being operative to: buffer a latest one of the random access points and any of the video frames dependent upon the latest random access point for decoding purposes; and purge from the fast channel change buffer the video frames which are older than the latest random access point;
a decoder arrangement including at least one decoder and at least one decoder buffer, the decoder arrangement being operative to decode the video data of the first TV channel;
a controller to receive a channel change command from a subscriber to change channels from the first TV channel to the second TV channel, the controller being operative to instruct the decoder arrangement, on receipt of the channel change command, to switch from decoding the video data of the first TV channel to decoding the video frames of the aggregated video service from the fast channel change buffer yielding a plurality of decoded video frames; and
a graphic engine to: extract the video data of the second TV channel from the decoded video frames of the aggregated video service yielding a full-screen video of the extracted video data of the second TV channel; and output the full-screen video to a display device for display, wherein the controller is operative to: instruct the demultiplexer arrangement to demultiplex the second TV channel from the at least one transport stream; and instruct the decoder arrangement to switch from decoding the video frames of the aggregated video service to decoding the video data of the second TV channel.

2. The system according to claim 1, wherein each of the video frames of the aggregated video services is formatted as a mosaic.

3. The system according to claim 1, wherein the controller is operative to:
query the fast channel change buffer to ascertain a video frame X having the latest presentation time stamp of the video frames in the fast channel change buffer;
instruct the decoder arrangement to fast forward from the latest random access point in the fast channel change buffer to frame X+1 of the frames in the fast channel change buffer, the frame X+1 being the frame to be presented after frame X, wherein the frames in the fast channel change buffer until, but not including, frame X+1 are decoded, but are not outputted to the graphic engine; and
instruct the decoder arrangement to decode the frame X+1 and subsequent frames to frame X+1 at real-time speed and for output to the graphic engine.

4. The system according to claim 1, further comprising a new channel buffer to buffer the video data of the second TV channel, wherein the controller is operative to instruct the decoder arrangement to switch from decoding the video frames of the aggregated video service to decoding the video data of the second TV channel from the new channel buffer.

5. The system according to claim 1, wherein the video data of the second TV channel extracted from the decoded video frames of the aggregated video service is of a lower picture quality than the video data of the second TV channel which is not received as part of the aggregated video service.

6. The system according to claim 1, wherein the graphic engine is operative to crop and enlarge the video data of the second TV channel extracted from the decoded video frames of the aggregated video service yielding the full-screen video.

7. The system according to claim 6, wherein the graphic engine is operative to change the aspect ratio of the video data of the second TV channel extracted from the aggregated video service.

8. The system according to claim 1, further comprising:
a security module to create a control word for decrypting the video frames of the aggregated video service if the subscriber is subscribed to any of the TV channels included in the aggregated video service; and
a decryption engine to decrypt the video frames of the aggregated video service based on the control word.

9. The system according to claim 8, wherein the demultiplexer arrangement is operative to filter an entitlement control message which includes information for creating the control word.

10. The system according to claim 8, wherein:
the controller is operative to send a query, upon receiving the channel change command from the subscriber to change channels from the first TV channel to the second TV channel, to the security module whether the subscriber has access to the second TV channel; and
the security module is operative to: check whether the subscriber has access; and send a suitable response to the controller.

11. A fast channel change method comprising:
receiving at least one transport stream including an aggregated video service and a plurality of TV channels, each of the TV channels including video data, the aggregated video service including a plurality of video frames, each of the video frames of the aggregated video service including some of the video data of each of the TV channels, the TV channels including a first TV channel and a second TV channel;
demultiplexing the first TV channel and the aggregated video service from the at least one transport stream;
buffering the video frames of the aggregated video service, the aggregated video service including a plurality of random access points; wherein the buffering includes buffering a latest one of the random access points and any of the video frames dependent upon the latest random access point for decoding purposes; and purging the video frames which are older than the latest random access point;
decoding the video data of the first TV channel;
receiving a channel change command from a subscriber to change channels from the first TV channel to the second TV channel; then
on receipt of the channel change command, switching from decoding the video data of the first TV channel to decoding the buffered video frames of the aggregated video service yielding a plurality of decoded video frames;
extracting the video data of the second TV channel from the decoded video frames of the aggregated video service yielding a full-screen video of the extracted video data of the second TV channel;
outputting the full-screen video to a display device for display;
demultiplexing the second TV channel from the at least one transport stream; and
switching from decoding the video frames of the aggregated video service to decoding the video data of the second TV channel.

* * * * *